United States Patent
Haridas et al.

(10) Patent No.: US 11,627,156 B2
(45) Date of Patent: Apr. 11, 2023

(54) SYSTEM AND METHOD FOR DETECTING BOTS USING SEMI-SUPERVISED DEEP LEARNING TECHNIQUES

(71) Applicant: KAALBI TECHNOLOGIES PRIVATE LIMITED, Bengaluru (IN)

(72) Inventors: Harisankar Haridas, Bengaluru (IN); Mohit Rajput, Bangalore (IN); Rakesh Thatha, Bengaluru (IN); Sonal Lalchand Oswal, Bengaluru (IN); Neeraj Kumar Gupta, Bengaluru (IN)

(73) Assignee: RADWARE LTD., Tel Aviv (IL)

( * ) Notice: Subject to any disclaimer, the term of this patent is extended or adjusted under 35 U.S.C. 154(b) by 675 days.

(21) Appl. No.: 16/574,556

(22) Filed: Sep. 18, 2019

(65) Prior Publication Data
US 2020/0099714 A1 Mar. 26, 2020

(30) Foreign Application Priority Data
Sep. 21, 2018 (IN) .............................. 201841035698

(51) Int. Cl.
*H04L 9/40* (2022.01)
*G06F 9/54* (2006.01)
*G06N 20/00* (2019.01)
*G06K 9/62* (2022.01)

(52) U.S. Cl.
CPC ............ *H04L 63/1441* (2013.01); *G06F 9/54* (2013.01); *G06K 9/6218* (2013.01); *G06N 20/00* (2019.01)

(58) Field of Classification Search
CPC ....... H04L 63/1441; G06N 20/00; G06F 9/54; G06K 9/6218
See application file for complete search history.

(56) References Cited

U.S. PATENT DOCUMENTS

| | | | |
|---|---|---|---|
| 8,762,298 B1* | 6/2014 | Ranjan | G06F 21/552 706/12 |
| 9,942,214 B1* | 4/2018 | Burciu | H04L 63/08 |
| 10,032,463 B1* | 7/2018 | Rastrow | G10L 15/183 |
| 10,438,225 B1* | 10/2019 | Reading | G06Q 30/0225 |
| 10,749,883 B1* | 8/2020 | Martin | G06F 21/554 |
| 10,885,167 B1* | 1/2021 | Lador | G06F 21/554 |
| 2008/0240566 A1* | 10/2008 | Thint | G06F 16/355 382/181 |
| 2009/0254989 A1* | 10/2009 | Achan | H04L 63/1441 703/21 |
| 2012/0084859 A1* | 4/2012 | Radinsky | G06F 21/56 707/E17.046 |
| 2013/0346311 A1* | 12/2013 | Boding | G06Q 20/3227 705/44 |
| 2015/0370623 A1* | 12/2015 | Wada | G06F 11/32 714/37 |
| 2016/0294773 A1* | 10/2016 | Yu | H04L 63/029 |

(Continued)

*Primary Examiner* — Ghodrat Jamshidi (74) *Attorney, Agent, or Firm* — M&B IP Analysts, LLC (57) ABSTRACT

A system of method of detecting bots are presented. The method includes receiving access patterns of a visitor accessing a protected web property, encoding each of the access patterns into a fixed length feature vector, determining an offline-trained model based on past data, generating an anomaly score based on the fixed length feature vector and an offline-trained model, and determining the visitor to be a bot, when the generated anomaly score associated with the visitor reaches a predetermined threshold.

17 Claims, 8 Drawing Sheets

(56) References Cited

U.S. PATENT DOCUMENTS

| | | | | |
|---|---|---|---|---|
| 2016/0344765 A1* | 11/2016 | Shiell | ............... | H04L 63/1458 |
| 2016/0352764 A1* | 12/2016 | Mermoud | ........... | H04L 63/1425 |
| 2017/0208052 A1* | 7/2017 | Jai | ........................ | H04L 63/08 |
| 2017/0353481 A1* | 12/2017 | Kong | ................. | H04L 63/1425 |
| 2018/0359223 A1* | 12/2018 | Maier | ................. | H04L 63/101 |
| 2019/0166141 A1* | 5/2019 | Xu | ...................... | G06N 3/0454 |
| 2019/0228099 A1* | 7/2019 | Bajaj | .................. | G06F 16/3329 |
| 2020/0065212 A1* | 2/2020 | Chanda | ............... | G06F 11/3452 |
| 2020/0090246 A1* | 3/2020 | Goyal | ................. | G06K 9/6223 |
| 2020/0242451 A1* | 7/2020 | Cao | ..................... | G06N 3/0481 |

* cited by examiner

SYSTEM AND METHOD FOR DETECTING BOTS USING SEMI-SUPERVISED DEEP LEARNING TECHNIQUES

CROSS-REFERENCE TO RELATED APPLICATIONS

This application claims the benefit of Indian Provisional Application No. 201841035698 filed on Sep. 21, 2018, the contents of which are hereby incorporated by reference.

TECHNICAL FIELD

The embodiments herein relate to a field of access control and security in accessing web properties. The embodiments herein are particularly related to a system and method for detecting and classifying visitor accessing web properties as human or bot using semi-supervised Deep Learning techniques.

BACKGROUND

A bot is a computer program, which is used to access web properties like websites and web-based Application Programming Interfaces (API). Bot is programmed to perform malicious activities like web scraping, spamming, account takeover, advertising fraud etc. Botnet refers to a set of bots running from multiple devices under a control of a single malicious actor. Bots and botnets increasingly pose a threat to the Internet. A bot detection refers to techniques, which classify a visitor accessing a web property as human or bot.

Bots try to mimic a human behavior to avoid detection and mitigation. Different bots show different levels of sophistication in their capability to mimic the human beings. A level of sophistication ranges from script-based bots to botnets with human-like interaction capabilities. The bots also mutate their behavior upon being identified to evade further detection.

As complex and diverse signals need to be analyzed, a handcrafted rule-based system does not scale to effectively detect bots. A machine learning-based approach, where the machine learns bot patterns from data with minimal human involvement/interface, is required for an effective bot detection. Specifically, a deep learning-based approach (subclass of machine learning) is found to be ideal, as deep learning does not require human involvement in creating handcrafted features for machine learning.

In a supervised machine learning-based bot detection process, data with correct label (e.g., bots or humans seen in the past) is used to train a machine-learning model to differentiate between the humans and the bots. As a supervised learning model is trained based on a past data, the supervised learning model suffers from a limitation of not detecting bot patterns that are not represented in the past data. For example, when bots mutate or advanced bots emerge, the supervised learning model is unable to detect such bots, as the model is not trained to detect the patterns.

On the other hand, an unsupervised learning technique identifies hidden patterns in unlabeled data such as grouping or anomalies. The unsupervised learning process helps in identifying the bots with anomalous characteristics (anomaly detection) and bot clusters (clustering). However, certain human visitors also have anomalous characteristics or grouping. For example, certain users of a web property are power users with higher-than-average levels of engagement. These frequent users are flagged as anomalies or clusters. Thus, a straightforward application of unsupervised learning to bot detection results in classifying humans as bots (false positives).

In view of the above discussion, there is a need for bot detection techniques that would overcome the deficiencies noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for detecting bots. The method includes receiving access patterns of a visitor accessing a protected web property, encoding each of the access patterns into a fixed length feature vector, generating an anomaly score based on the fixed length feature vector and an offline-trained model, and determining the visitor to be a bot, when the generated anomaly score associated with the visitor reaches a predetermined threshold.

Certain embodiments disclosed herein also include a non-transitory computer readable medium having stored thereon causing a processing circuitry to execute a process for detecting bots. The process includes receiving access patterns of a visitor accessing a protected web property, encoding each of the access patterns into a fixed length feature vector, generating an anomaly score based on the fixed length feature vector and the offline-trained model, and determining the visitor to be a bot, when the generated anomaly score associated with the visitor reaches a predetermined threshold.

Certain embodiments disclosed herein also include a system for detecting bots. The system includes a processing circuitry, and a memory. The memory contains instructions that, when executed by the processing circuitry, configure the system to receive access patterns of a visitor accessing a protected web property, encode each of the access patterns into a fixed length feature vector, generate an anomaly score based on the fixed length feature vector and an offline-trained model, and determine the visitor to be a bot, when the generated anomaly score associated with the visitor reaches a predetermined threshold.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

In the following detailed description, a reference is made to the accompanying drawings that form a part hereof, and in which the specific embodiments that may be practiced is shown by way of illustration. These embodiments are described in sufficient detail to enable those skilled in the art to practice the embodiments and it is to be understood that other changes may be made without departing from the scope of the embodiments. The following detailed description is therefore not to be taken in a limiting sense.

The embodiments herein provide a system and method for classifying a visitor accessing a web property as a human or bot using semi-supervised Deep Learning techniques. The embodiments herein also provide a system and method for detecting one or more bots trying to access a web property using the semi-supervised deep learning technique that employs intent-based deep behavior analysis (IDBA). Further, the embodiments herein provide a system configured for identifying one or more bots that are not represented in a past data.

The embodiments herein also provide a system configured for identifying one or more bots by minimizing false positives. The embodiments herein are further provided a method for identifying one or more bots trying to access a web property. The embodiments herein also provide a pre-processing scheme with encoding of visitor traffic in a web page and selection of visitors for analysis.

The embodiments herein further provide a deep learning-based supervised encoder with implementing anomaly detection and clustering systems. The embodiments herein also provide an adaptive learning technique along with the prediction systems. The embodiments herein further provide a system and method to perform analysis at a level of IP addresses and detailed signature-based blocking.

The embodiments herein will become readily apparent from the following detailed description taken in conjunction with the accompanying drawings.

That is, the various embodiments of the embodiments herein provide a system and method for detecting one or more bots based on a semi-supervised deep learning technique that employs Intent-based Deep Behavior Analysis (IDBA) which further addresses the shortcomings of supervised and unsupervised machine learning techniques. The system includes an encoder network component, an anomaly detector component coupled to the encoder network component, a cluster detector component coupled to the encoder network component and an adaptive learner component coupled to the cluster detector and anomaly detector components. Use of deep learning techniques in bot detection minimizes the human involvement in handcrafting features.

According to one embodiment, an overall architecture of a bot detection system is provided. The system architecture includes an Intent-based Deep Behavior Analysis (IDBA) component, a server-side connector component, a third-party Application Programming Interface (API) clients component, a web browser component and a mobile application component. The IDBA component is a bot detection engine in the present architecture. The third-party API clients component is configured to connect with the server-side connector component for sending API requests and receiving API responses. The server-side connector component is configured to connect to the IDBA component for sending server-side API call and receive suggested actions from the IDBA component. The server-side connector component is also configured to connect to the mobile application component for receiving mobile application API calls and sending mobile application API call responses. The server-side connector component is also configured to connect to the web browser component for receiving HTTP requests and sending HTTP responses with cookies. The IDBA component is configured to receive application parameters from the mobile application component and JavaScript parameters from the web browser component.

According to one embodiment, a supervised encoder network using IDBA is provided. The supervised encoder network includes two layers. The two layers are a training layer and a prediction layer. The training layer includes an input component, an encoder component, a dense layer component and an output (bot/human) component. The encoder component includes a plurality of Long Short Term Memory (LSTM) sub-components. The prediction layer includes an input component, an encoder component, an anomaly detector component and a cluster detector component. The encoder component is configured to extract inputs from the encoder component present in the training layer. The anomaly detector component provides a set of anomaly scores, and the cluster detector component provides a set of clusters as output.

According to one embodiment of the embodiments herein, a one-class collective bot intelligence learner network is provided. The network includes an input component, a fixed length layer and an output component. The fixed length layer further includes a plurality of Long Short Term Memory (LSTM) sub-components.

The encoder network component is trained using labeled data of past visitors. The data on a plurality of real-time visitors (unlabeled) is then encoded using the encoder network component. The encoded information is then passed through the anomaly detector component and the cluster detector component. The scores or classes produced by the anomaly detector component and cluster detector component are then sent to the adaptive learner component, which takes action on suspected bots (based on the scores or classes).

According to one embodiment, the system is incorporated in a server configured for providing access to a web property. The server includes a local server, a remote server, a web server and a cloud server.

A plurality of end users (visitors) are enabled to access the web properties through web browsers or mobile apps or third-party API clients. The system is configured to collect information on the visitors through connectors (programs/plugins) installed in the web servers of the web property. In addition, information is collected by executing a JavaScript® file in the web browsers of the visitors or by installing a mobile application software development kit (SDK) in the mobile devices of the visitors. The collected information is sent to the system through API calls.

The information for bot detection is collected through multiple sources such as HTTP headers, cookies, IP address, browser parameters and interaction events like mouse movement, clicks etc.

Figure 1:
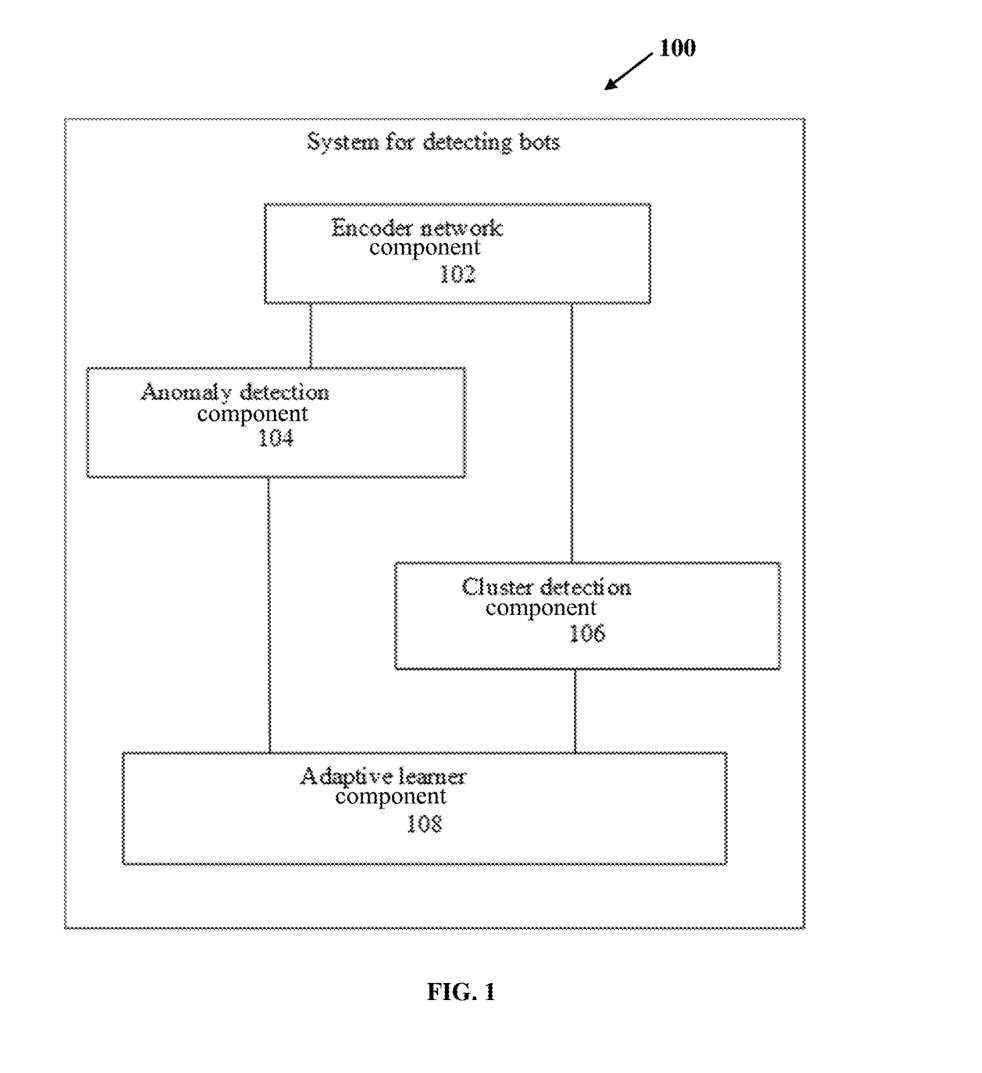
FIG. 1 is a block diagram of a system for identifying one or more bots trying to access a web property, according to an embodiment.

The system 100, as shown in FIG. 1, includes an encoder network component 102, an anomaly detector component 104 connected to the encoder network component 102, a cluster detector component 106 connected to the encoder network component 102 and an adaptive learner component 108 connected to the cluster detector component 106 and the anomaly detector component 104.

The encoder network component 102 in one exemplary embodiment includes, at least in part, a Long Short Term Memory (LSTM)-based Recurrent Neural Network (RNN) that is trained to classify between humans and bots using past data. The encoder network component 102 is configured to transform a raw sequence of events and requests made by one or more visitors into a fixed length feature vector. As the encoder network component 102 is trained based on data from past usages that are labeled, the features which are present in the encoded patterns of fixed length feature vectors markedly differ between known bots and humans.

According to one embodiment, at least four features of each request made by the visitor are considered for analysis. The four features are a URL requested feature, a referrer requested feature, a value of a counter cookie and a timestamp. The counter cookie is incremented by the connectors/JavaScript/mobile app SDK for each request made by the visitor. However, it should be appreciated that the solution described herein is general and is applicable for any number of features.

According to one embodiment, URL and referrers are hashed into h-bit vectors (e.g., h=22) and the hashed values are sent for further processing. Alternatively, the delta values (different between current value and corresponding value in previous request) of the counter cookies and the timestamp are considered for further processing.

Accordingly, when a new visitor arrives, the access patterns of the visitors are encoded into fixed length feature vectors using the encoder network component 102. The anomaly detector coupled to the encoder network component 102 is configured for anomaly detection in the fixed length feature vector.

The anomaly detector component 104 intakes the fixed length feature vectors of the visitors (who are not flagged as bots yet) and performs anomaly detection. Isolation forest or similar off-the-shelf anomaly detectors are used to detect anomalies on fixed length feature vectors for flagging bots displaying anomalous patterns. The anomaly detector component 104 is trained in offline based on the past data and anomaly scores are computed on a real-time basis on live traffic using the offline-trained model. A plurality of anomaly scores is generated and passed to the adaptive learner component 108. A plurality of visitors with most suspicious anomaly scores is flagged as bots.

Botnets with similar intent appear as clusters. The cluster detector component 106 is configured for identifying a plurality of botnets as clusters using Density-Based Spatial Clustering of Applications with Noise (DBSCAN) or similar off-the-shelf clustering algorithm. This cluster information is passed on to an adaptive learner component 108 to identify and take action against botnet clusters.

Information from both the anomaly detector component 104 and cluster detector component 106 are used by the adaptive learner component 108 to take action against detected bots (e.g., show Completely Automated Public Turing Test (CAPTCHA)). The training and prediction are performed at the level of granularity of IP addresses to reduce computational complexity. An action against any detected IP addresses are taken at the level of signatures associated with the most active device using the IP address to reduce the chance of false positives.

Here, anomalies detection may include identification of an item, or series of items, which do not conform to other items in a series of data. Sometimes these data anomalies may identify welcomed behavior, such as the case where the number of visitors to a web site has increased due to a successful campaign. Other times, however, it may indicate unwanted behavior. For example, visitor counts may increase during a hacking or a fraud attempt on a website or database.

In a plurality of current real-world systems, bot detection is performed using a combination of hand-crafted rules and blacklists, machine learning systems and human security analysts. The configuration involved in each of these systems is different for protecting different web properties. However, the common patterns present in the bots already detected in the different web properties, termed collective intelligence, can be used to identify bots which appear in future even on new web properties.

The adaptive learner component 108 is configured to employ the Intent based deep behavior analysis (IDBA) that captures common patterns present in the detected bots. The encoder network component 102 is trained to compress the raw sequence of events and requests made by past bots into fixed length feature vectors and to then decompress the fixed length feature vectors to the original raw sequence. Frequently occurring bot patterns include low reconstruction error, when compression and decompression are performed by the encoder network component 102. Accordingly, reconstruction errors associated with new visitors are used to detect one or more bots and actions are taken on the detected bots by feeding the reconstruction error values to the adaptive learner component 108.

The adaptive learner component 108 is configured to accept anomaly scores and the clusters related to the visitors and takes actions against visitors who are classified as 'suspicious'. The actions include exhibiting/displaying a blocking page, exhibiting/displaying captcha, enforcing multi-factor authentication, and so on. Feedback, such as captcha solving, is available/provided to the adaptive learner component 108. This feedback is used by the adaptive learner component 108 to learn the model settings such as appropriate thresholds on the anomaly scores.

Here, anomaly score may refer to score for observation of anomalies over a time series, using a predictive technique using historical data and statistical models. When observed values do not match predicted values, an anomaly is assumed.

The visitors already identified as bots to a web property, have low reconstruction error. The visitors who are not detected as bots have low reconstruction error (less than −0.025) resembling bots. These visitors are suspicious bots and action is taken against the suspicious bots. The advanced bots and mutated bots unseen/not detected/not present in a past data available for real world bot detection systems, are classified as humans (a false negative error contaminating the data). As the adaptive learner component 108 is not trained based on the patterns labeled as human in the past data, the adaptive learner component 108 is immune to this issue present in the training data.

In the above components, training and prediction are performed at the level of granularity of IP addresses to reduce computational complexity. The actions against caught IP addresses are taken at the level of signatures associated with the most active device using the IP address to reduce a chance of false positives. Example signatures are <IP address>:<most active user agent used with the IP address>, <IP address>:<most active tracking cookie used with the IP address>.

In the aforementioned cases, training of the models is performed based on the past data available for long durations (e.g., days, months, and the like) for multiple web properties. The trained models are saved and used at runtime for faster and less compute intensive predictions.

Figure 2:
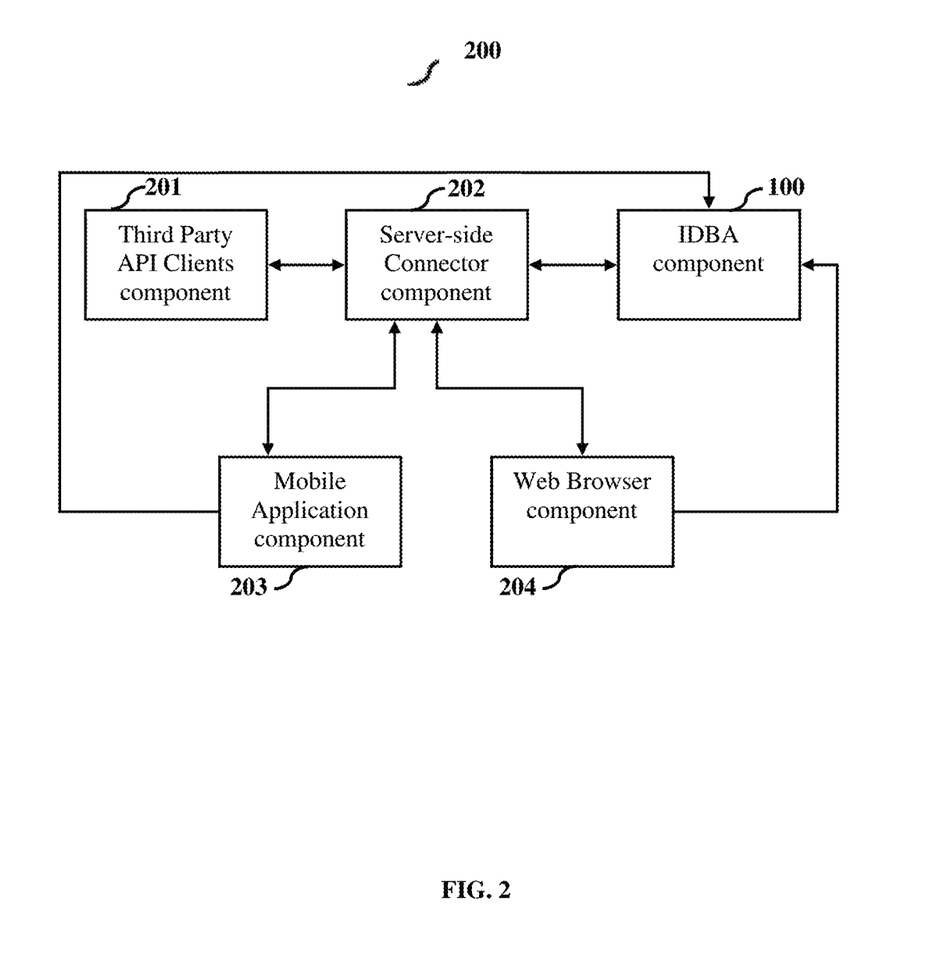
FIG. 2 is an overall architecture of a bot detection system, according to an embodiment.

FIG. 2 illustrates an overall architecture of a system 200 configured for bot detection according to an embodiment. The system 200 is configured to automatically detect bots using iterative clustering and feedback-driven adaptive learning.

In an embodiment, the system 200 includes an Intent-based Deep Behavior Analysis (IDBA) component 100, a Server-side Connector component 202, a Third-Party API Clients component 201, a Web Browser component 204, and a Mobile Application component 203. The IDBA component 100 is a bot detection engine in the present architecture. The Third-Party API Clients component 201 is configured to connect with the Server-side Connector component 202 for sending API requests and receiving API responses. The Server-side Connector component 202 is configured to connect to the IDBA component 100 for sending server-side API call and receive suggested actions from the IDBA component 100. The Server-side Connector component 202 is also configured to connect to the Mobile Application component 203 for receiving mobile application API calls and sending mobile application API call responses. The Server-side Connector component 202 is also configured to connect to the Web Browser component 204 for receiving HTTP requests and sending HTTP responses with cookies. The IDBA component 100 is configured to receive a plurality of application parameters from the Mobile Application component 203 and script (e.g., JavaScript) parameters from the Web Browser component 204.

The various components shown in FIG. 2 can be implemented in hardware, software, or any combination thereof. Specifically, each, some, or all of the hardware elements may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), general-purpose microprocessors, microcontrollers, digital signal processors (DSPs), tensor processing units (TPUs), graphics processing unit (GPUs), and the like, or any other hardware logic components that can perform calculations or other manipulations of information.

Also, software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by a processing circuitry, cause the processing circuitry to perform the various processes described herein.

Figure 3:
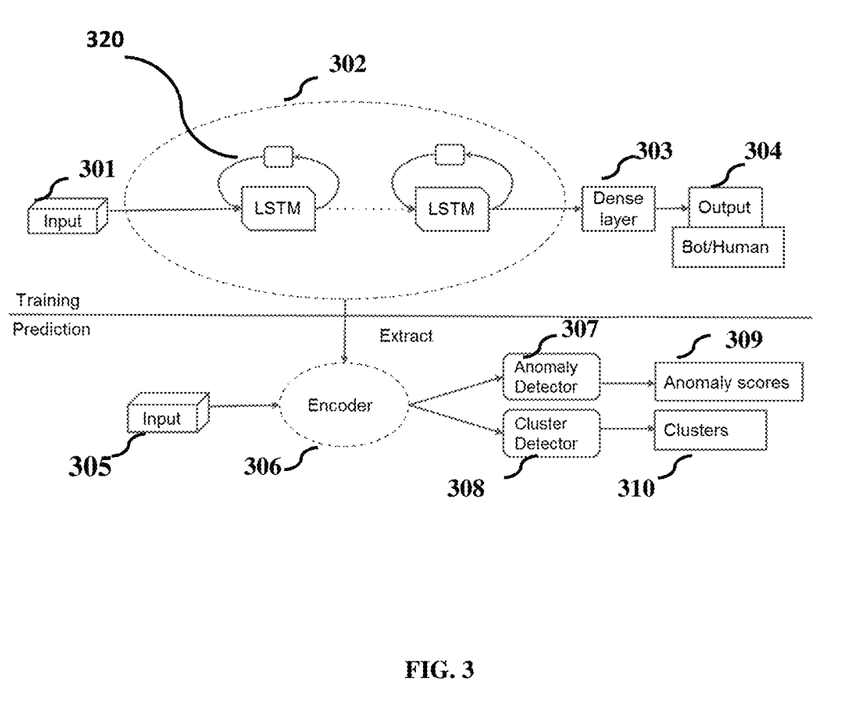
FIG. 3 illustrates a block diagram of a supervised encoder network used in IDBA, according to an embodiment.

FIG. 3 illustrates a block diagram of a supervised encoder network used in IDBA. The supervised encoder network includes two layers. The two layers include a Training layer and a Prediction layer. The Training layer includes an Input component 301, a first Encoder component 302, a Dense layer component 303, and an Output (Bot/Human) component 304. The first Encoder component 302 includes a plurality of Long Short Term Memory (LSTM) sub-components 320. The Prediction layer includes an Input component 305, a second Encoder component 306, an Anomaly Detector component 307 and a Cluster Detector component 308. The second Encoder component 306 is configured to extract models from the Encoder component 302 present in the Training layer. The Anomaly Detector component 307 is configured to provide a set of Anomaly Scores 309 and the Cluster Detector component 308 provides a set of Clusters 310 as output.

Figure 4:
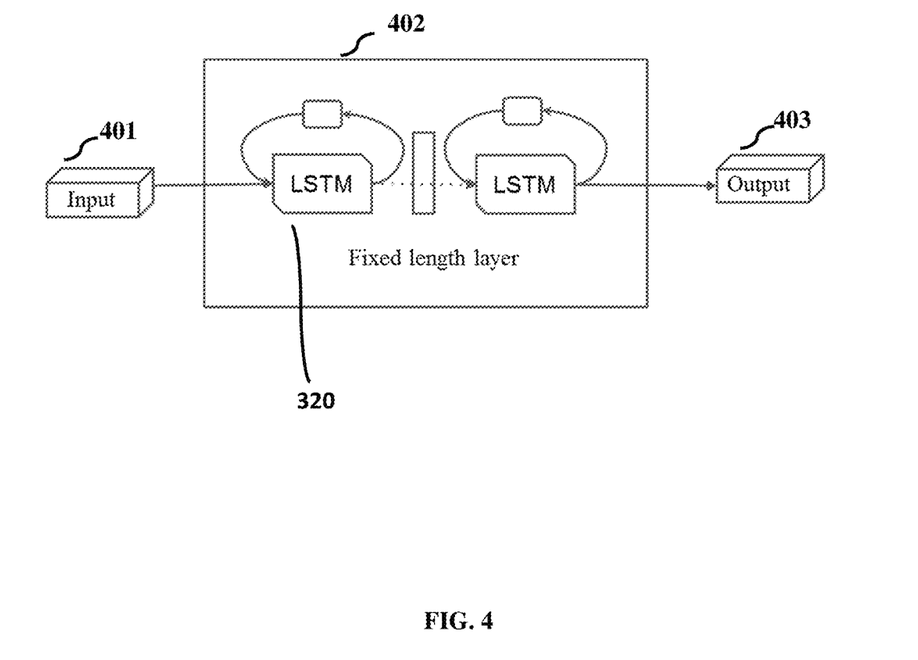
FIG. 4 illustrates a block diagram of one-class collective bot intelligence learner network, according to an embodiment.

FIG. 4 illustrates a block diagram of one-class collective bot intelligence learner network. The network includes an Input component 401, a Fixed Length layer 402 and an Output component 403. The Fixed Length layer 402 further includes a plurality of Long Short-Term Memory (LSTM) sub-components 320.

In operation, labeled data of past visitors may be input from the input component into the Fixed Length layer 402. The labeled data is organized and transformed into fixed-length feature vectors in the Fixed Length layer by the LSTM sub-components 320. Finally, the fixed-length feature vectors are then output to the Output component 403 for use in determining whether the new visitors to the web property are bots to be excluded from the web property.

Figure 5:
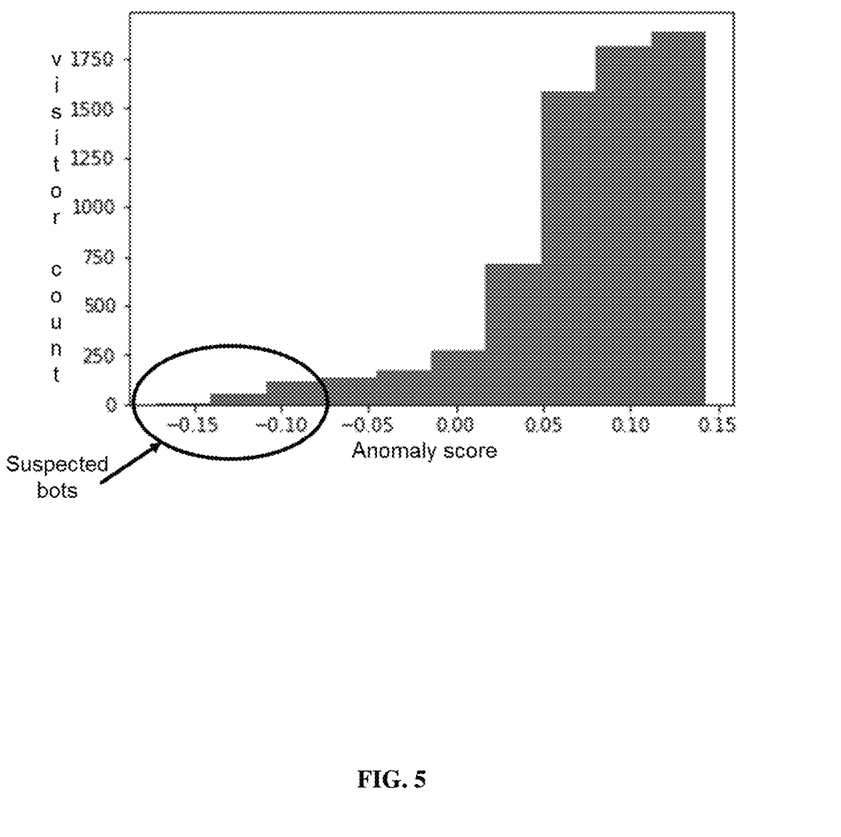
FIG. 5 is a histogram illustrating anomaly scores of a plurality of visitors, according to an embodiment.

FIG. 5 is an exemplary histogram illustrating anomaly scores of a plurality of visitors. Here, the anomaly score may be charted against the visitor count. The visitors with low counts and with low anomaly scores may be marked as suspected bots.

Figure 6:
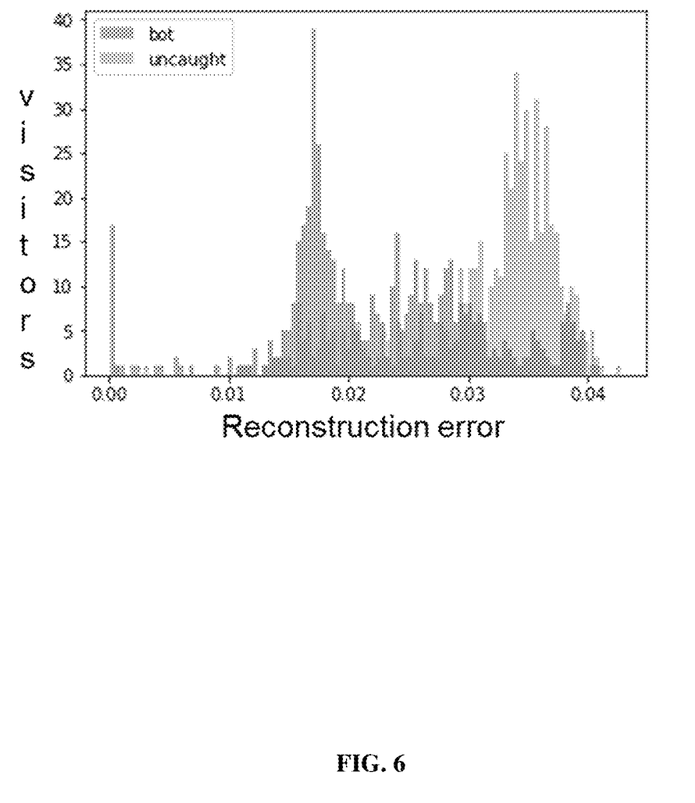
FIG. 6 is a histogram illustrating reconstruction of errors for a new set of visitors, according to an embodiment.

FIG. 6 is an exemplary histogram illustrating reconstruction of errors for a new set of visitors. Here, the reconstruction error value is charted against the number of visitors to the system 200. The darker colored graphic depicts visitors who have been labeled as bots, while the lighter areas depict actual bots that are uncaught. As can be seen, it is likely that bots with high visitor and high reconstruction values are likely to be uncaught.

Figure 7:
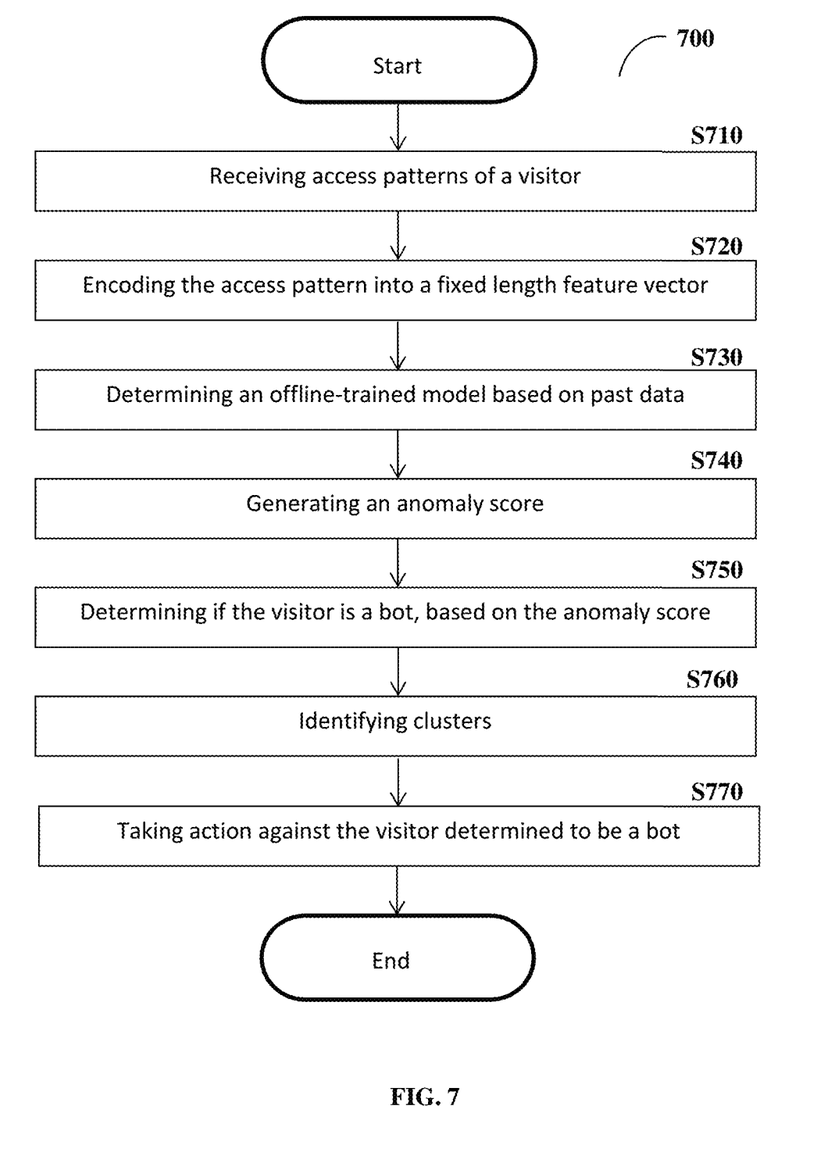
FIG. 7 is a flowchart for determining a bot and taking action against the bot, according to an embodiment.

FIG. 7 is a flowchart 700 describing a method for detecting and blocking bots according to an embodiment. The method may be performed by the system 200 including the IDBA component 100 according to an embodiment herein.

At S710, the access patterns of a visitor that attempted to gain access to a protected web property are received. The web property may include a web application, web data, and the like. At S720 the received access patterns are encoded into a fixed length feature vector. For example, the encoder network component 102 within the IDBA component 100 of the system 200 may be configured to transform a raw sequence of events and requests made by one or more visitors into a fixed length feature vector.

For example, at least four features of each request made by the visitor are considered for analysis. The four features are a URL requested feature, a referrer requested feature, a value of a counter cookie and a timestamp. The counter cookie is incremented by the connectors/JavaScript/mobile app SDK for each request made by the visitor. However, it should be appreciated that the solution described herein is general and is applicable for any number of features.

According to one embodiment, URL and referrers are hashed into h-bit vectors (e.g., h=22) and the hashed values are sent for further processing. Alternatively, the delta values (different between current value and corresponding value in previous request) of the counter cookies and the timestamp are considered for further processing.

Accordingly, when a new visitor arrives, the access patterns of the visitors are encoded into fixed length feature vectors using the encoder network component 102. The anomaly detector connected to the encoder network component 102 is configured for anomaly detection in the fixed length feature vector.

At S730, an offline-trained model based on past data are determined. That is, the past data may be received, and the determining of the offline-trained model may be carried out by the adaptive learner component 108 within the IDBA component 100 of the system 200. Alternatively, the encoder network component 102 may be trained based on data from past usages that are labeled, the information of which are received and incorporated into the encoded patterns of fixed length feature vectors generated by the encoder network component 102. These fixed length feature vectors between known bots and visitors have vastly different features.

That is, the encoder network component 102 may be trained to compress the raw sequence of events and requests made by past bots into fixed length feature vectors and to then decompress the fixed length feature vectors to the original raw sequence.

At S740, an anomaly score based on the fixed length feature vector and the past data is generated. The anomaly score generation may be carried out by the anomaly detection component 104 within the IDBA component 100 of the system 200.

In more detail, the anomaly detector component 104 intakes the fixed length feature vectors of the visitors (who are not flagged as bots yet) and performs anomaly detection. Isolation forest or similar off-the-shelf anomaly detectors are used to detect anomalies on fixed length feature vectors for flagging bots displaying anomalous patterns. The anomaly detector component 104 is trained in offline based on the past data and anomaly scores are computed on a real-time basis on live traffic using the offline-trained model. A plurality of anomaly scores is generated and passed to the adaptive learner component 108. A plurality of visitors with most suspicious anomaly scores is flagged as bots.

At S750, the anomaly score is processed to determine if the current visitor to be a bot, when the generated anomaly score associated with the visitor reaches a predetermined threshold. Here, anomaly score may refer to score for observation of anomalies over a time series, using a predictive technique using historical data and statistical models. When observed values do not match predicted values, an anomaly is assumed. Also, the threshold may be a low predefined reconstruction error value based on the IDBA, determined by the adaptive learner component 108 within the IDBA component 100 of the system 200.

That is, the adaptive learner component 108 is configured to employ the Intent based deep behavior analysis (IDBA) that captures common patterns present in the detected bots. Frequently occurring bot patterns often include low reconstruction error, when compression and decompression are performed by the encoder network component 102. Accordingly, reconstruction errors associated with new visitors are used to detect one or more bots, and actions are taken on the detected bots by feeding the reconstruction error values to the adaptive learner component 108.

Generally, the visitors already identified as bots to a web property, have low reconstruction error. The visitors who are not detected as bots have low reconstruction error (less than −0.025) resembling bots. These visitors are suspicious bots and action is taken against the suspicious bots. The advanced bots and mutated bots unseen/not detected/not present in a past data available for real world bot detection systems, are classified as humans (a false negative error contaminating the data). As the adaptive learner component 108 is not trained based on the patterns labeled as human in the past data, the adaptive learner component 108 is immune to this issue present in the training data.

Further, clusters from botnets as described above are identified. This may be carried out using DBSCAN, for example, by the cluster detection component 160 within the IDBA component 100 of the system 200. That is, Botnets with similar intent appear as clusters. The cluster detector component 106 is configured to identify a plurality of botnets as clusters using DBSCAN or similar off-the-shelf clustering algorithm. This cluster information is passed on to an adaptive learner component 108 to identify and take action against botnet clusters.

Also, at S770 based on the anomaly score and the cluster identification information received, a mitigation action may be taken against the visitor that has been identified as a bot. The mitigation action may include displaying a blocking page, displaying a CAPTCHA challenge, causing the visitor to perform a web challenge, enforcing multi-factor authentication, and so on.

That is, information from both the anomaly detector component 104 and cluster detector component 106 are used by the adaptive learner component 108 to take action against detected bots (e.g., by performing Completely Automated Public Turing Test (CAPTCHA)). The training and prediction are performed at the level of granularity of IP addresses to reduce computational complexity. Based on the information gathered and analysis, the adaptive learner component 108 may take an action against any detected IP addresses at a level of signatures associated with the most active device using the IP address to reduce the chance of false positives.

Although the embodiments herein are described with various specific embodiments, it will be obvious for a person skilled in the art to practice the embodiments herein with modifications.

Figure 8:
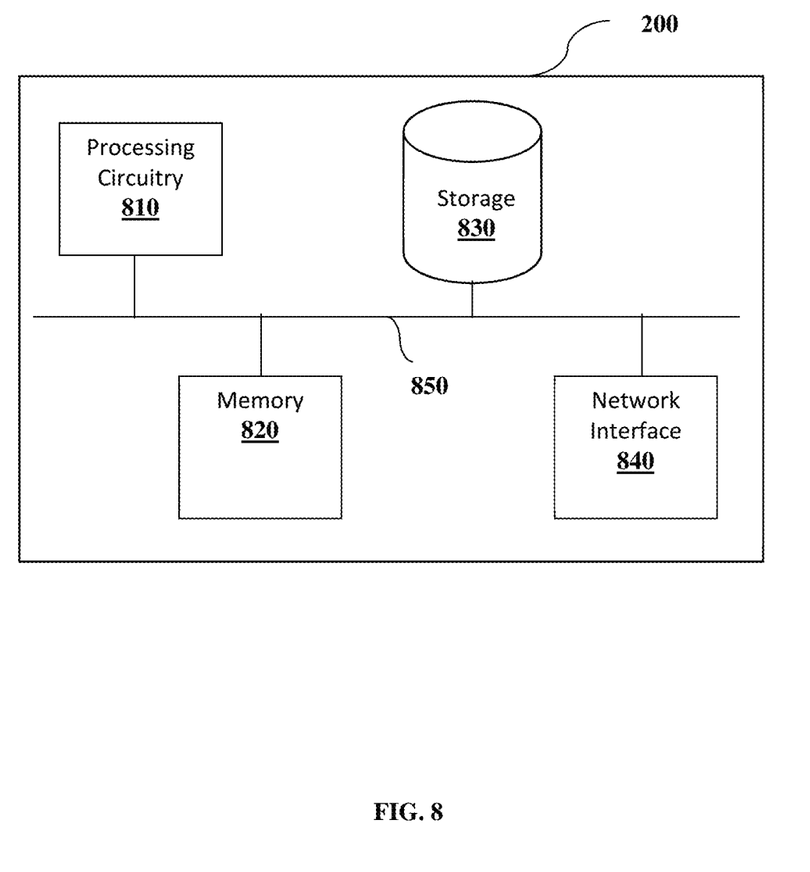
FIG. 8 is a schematic diagram of a detection system according to an embodiment.

FIG. 8 is an example schematic diagram of a bot detection system 200 according to an embodiment. The system 200 includes a processing circuitry 810 coupled to a memory 820, a storage 830, and a network interface 840. In an embodiment, the components of the system 200 may be communicatively connected via a bus 850.

The processing circuitry 810 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), general-purpose microprocessors, microcontrollers, digital signal processors (DSPs), and the like, or any other hardware logic components that can perform calculations or other manipulations of information.

The memory 820 may be volatile (e.g., RAM, etc.), non-volatile (e.g., ROM, flash memory, etc.), or a combination thereof. In one configuration, computer readable instructions to implement one or more embodiments disclosed herein may be stored in the storage 830.

In another embodiment, the memory 820 is configured to store software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 810, cause the processing circuitry 810 to perform the various processes described herein for detecting and block bots. In an embodiment, the processing circuitry 810 is configured to perform the process described with reference to FIG. 7.

The storage 830 may be magnetic storage, optical storage, and the like, and may be realized, for example, as flash memory or other memory technology, CD-ROM, Digital Versatile Disks (DVDs), or any other medium which can be used to store the desired information. Such information may include labeled data, visitors classified as bots, access patterns of visitors, and so on.

The network interface 840 allows the system 800 to communicate with various components to receiving past and current labeled data, block visitors labeled as bots, and communicate with other sources for reporting. The network interface 840 may allow communication over wired and/or wireless networks.

It should be understood that the embodiments described herein are not limited to the specific architecture illustrated in FIG. 8, and other architectures may be equally used without departing from the scope of the disclosed embodiments.

The various embodiments of the embodiments herein provide a system and method for detecting bots using a semi-supervised deep learning (SDL) technique that minimizes involvement of humans in hand-crafting features. The system and method described herein enhance accuracy in identifying bots by minimizing false positives.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; A and B in combination; B and C in combination; A and C in combination; or A, B, and C in combination.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for detecting bots, comprising:
receiving access patterns of a visitor accessing a protected web property;
encoding each of the access patterns into a fixed length feature vector;
generating an anomaly score based on the fixed length feature vector and an offline-trained model;
determining the visitor to be a bot, when the generated anomaly score associated with the visitor reaches a predetermined threshold;
identifying a cluster based on the fixed length feature vector; and
taking a mitigation action against the determined bot and the identified cluster.

2. The method of claim 1, wherein the mitigation action includes at least one of: displaying a blocking page, displaying a Completely Automated Public Turing Test (CAPTCHA) challenge, or enforcing multi-factor authentication.

3. The method of claim 1, further comprising:
providing a feedback to construct a model setting, the model setting includes the predetermined threshold for the anomaly score.

4. The method of claim 1, further comprising:
employing intent deep behavior analysis (IDBA) to capture common patterns present in the determined bot.

5. The method of claim 1, wherein the access pattern of the visitor is received by collecting information gathered from any one of: an application parameter and a JavaScript parameter through a server-side Application Programming Interface (API) call.

6. The method of claim 1, further comprising:
determining an offline-trained model based on the past data; and
generating the anomaly score and the cluster based on the offline-trained model.

7. The method of claim 1, wherein the offline-trained model is trained using labeled data.

8. The method of claim 1, wherein a plurality of botnets are identified as the cluster using Density-Based Spatial Clustering of Applications with Noise (DBSCAN).

9. A method for detecting bots comprising:
receiving access patterns of a visitor accessing a protected web property;
encoding each of the access patterns into a fixed length feature vector;
generating an anomaly score based on the fixed length feature vector and an offline-trained model;
determining the visitor to be a bot, when the generated anomaly score associated with the visitor reaches a predetermined threshold; and
employing intent deep behavior analysis (IDBA) to capture common patterns present in the determined bot.

10. A system for detecting bots, comprising:
a processing circuitry; and
a memory, the memory containing instructions that, when executed by the processing circuitry, configure the system to:
receive access patterns of a visitor accessing a protected web property;
encode each of the access patterns into a fixed length feature vector;
generate an anomaly score based on the fixed length feature vector and an offline-trained model; and
determine the visitor to be a bot, when the generated anomaly score associated with the visitor reaches a predetermined threshold;
identify a cluster based on the fixed length feature vector; and
take a mitigation action against the determined bot and the identified cluster.

11. The system of claim 10, wherein the mitigation action includes at least one of: displaying a blocking page, displaying a Completely Automated Public Turing Test (CAPTCHA), or enforcing multi-factor authentication.

12. The system of claim 10, wherein the system is further configured to:
provide a feedback to construct a model setting, the model setting including the predetermined threshold for the anomaly score.

13. The system of claim 10, wherein the system is further configured to:
employ Intent Deep Behavior Analysis (IDBA) to capture common patterns present in the determined bot.

14. The system of claim 10, wherein the access pattern of the visitor is received by gathering information gathered from any one of: an application parameter and a JavaScript parameter through a server-side Application Programming Interface (API) call.

15. The system of claim 10, wherein the system is further configured to:
determine an offline-trained model based on the past data; and
generating one of the anomaly score and the cluster based on the offline-trained model.

16. The system of claim 10, wherein the offline-trained model is trained using labeled data.

17. The system of claim 10, wherein a plurality of botnets are identified as the cluster using Density-Based Spatial Clustering of Applications with Noise (DBSCAN).

* * * * *